United States Patent [19]

Heimberg et al.

[11] Patent Number: 5,246,779

[45] Date of Patent: Sep. 21, 1993

[54] MICROFINE PROPYLENE POLYMER POWDERS AND PROCESS FOR THEIR PREPARATION

[75] Inventors: Manfred Heimberg, Cincinnati, Ohio; Daniel J. Ondrus, Farmington Hills, Mich.

[73] Assignee: Quantum Chemical Corporation, New York, N.Y.

[21] Appl. No.: 927,750

[22] Filed: Aug. 10, 1992

[51] Int. Cl.$^5$ ............................ C08F 6/24; C08F 8/50
[52] U.S. Cl. .................................. 428/402; 528/491; 528/494; 525/333.8; 525/387; 525/938
[58] Field of Search ............... 428/402; 528/491, 494, 528/499; 525/333.8, 387, 938

[56] References Cited

U.S. PATENT DOCUMENTS

| | | | |
|---|---|---|---|
| 3,144,436 | 8/1964 | Greene et al. | 260/93.7 |
| 3,422,049 | 1/1969 | McClain | 260/29.6 |
| 3,432,483 | 3/1969 | Peoples et al. | 260/87.3 |
| 3,563,970 | 2/1971 | Leicht et al. | 528/494 X |
| 3,746,681 | 7/1973 | McClain | 260/29.6 |
| 3,940,739 | 2/1976 | Quimet | 340/164 R |
| 3,970,719 | 7/1976 | Edmonds | 260/878 B |
| 4,039,632 | 8/1977 | Edmonds | 260/878 B |
| 4,061,694 | 12/1977 | Castagna | 260/878 B |
| 4,504,653 | 3/1985 | Kuwabara et al. | 528/494 X |

OTHER PUBLICATIONS

*Encyclopedia of Chemical Technology*, vol. 16, Third Edition, pp. 453–465, John Wiley & Sons (New York).
*Encyclopedia of Polymer Science & Engineering*, vol. 13, pp. 464–479, John Wiley & Sons (New York).
*Product Finishing*, pp. 22–27 (9/1990).

*Primary Examiner*—Fred Teskin
*Attorney, Agent, or Firm*—Kenneth D. Tremain; Gerald A. Baracka

[57] ABSTRACT

The present invention is directed to improved microfine propylene polymer powders having reduced fines which are comprised of spherical or substantially spherical particles and have a number average particle size from about 25 to about 60. A process for preparing the improved powders is also provided. The process involves dispersing a molten propylene homopolymer or copolymer which has been visbroken in a liquid medium in the presence of a nonionic surfactant, cooling the dispersion below the melt point of the propylene polymer and recovering the powder.

17 Claims, 2 Drawing Sheets

MICROFINE PROPYLENE POLYMER POWDERS AND PROCESS FOR THEIR PREPARATION

BACKGROUND OF THE INVENTION

1. Field of the Invention

The present invention relates to improved microfine propylene polymer powders which are spherical or substantially spherical in shape. The improved powders of the invention have reduced fines and a particle size distribution which renders them useful for powder coatings and especially for electrostatic spray coatings. The invention also relates to a process for producing the improved propylene polymer powders.

2. Description of the Prior Art

Thermoplastic resin powders are widely used in industry and these uses are well documented in the prior art. For example, powdered thermoplastic resins in dry form have been used to coat articles by dip coating in either a static or fluidized bed and by powder coating wherein the powder is applied by flame or electrostatic spraying or dusting. Powders can also be applied in dispersed form, by roller coating, spray coating, slush coating, and dip coating substrates such as metal, paper, paperboard, and the like. Powders are also widely employed for conventional powder molding processes, e.g., rotational molding and rotational lining. Still other applications for powders include use as paper pulp additives; mold release agents; additives for waxes, paints, caulks, and polishes; binders for non-woven fabrics; etc.

Besides the physical properties of the powder, which are dictated primarily by the resin being used, the size and shape of the powder particles are also important considerations in the selection of a powder for a particular application. These latter properties are primarily a function of the process by which the powders are prepared, which can include mechanical grinding, solution processes or dispersion processes. Particle size is determined using U.S. Standard Sieves or light scattering techniques and, depending on the method used, will be reported in mesh size or microns. The inverse relationship between the sieve size (mesh number) and particle size (in microns) is well documented and conversion tables are available. The shape of the particles is ascertained from photomicrographs of the powders. Particle shape has a marked influence on the bulk density and handling characteristics of the powder.

It is known that the presence of substantial amounts of "fines," i.e., particles having average diameters of 10 microns or less, can create problems in electrostatic powder coating operations. Some of the most common operational problems arising from the presence excess fines are identified by D. S. Tyler, *Product Finishing*, September 1990, pp. 23-26. Most significantly, the article points out that these fine particles have so little mass that they tend to be carried away from the product to be coated and into the reclaim system. The author cites studies which show that virtually no particles having an average particle size of less than 10 microns are retained on the coated part and concludes that substantial reduction or elimination of such particles is desirable.

Crystalline propylene polymers posses a desirable balance of toughness and chemical and solvent resistance. Furthermore, their low cost, low specific gravity, and low melt point make them useful for fusion coating processes. The utility of propylene polymers has been somewhat limited, however, due to the lack of availability of powders having suitable particle size and/or particle size distribution.

Powders can be produced using dispersion techniques, such as those described in U.S. Pat. Nos. 3,422,049 and 3,746,681. Such processes produce particles which are spherical in shape and have a relatively narrow size range, i.e., particle size distribution. These dispersion procedures involve subjecting the molten resin in about 0.8 to 9 parts by weight of water per part of resin to vigorous agitation in the presence of from about 2 to 25 parts by weight per 100 parts of resin of a water-soluble block copolymer of ethylene oxide and propylene oxide having a molecular weight above about 3500 and containing at least about 50% by weight of ethylene oxide so that a fine dispersion is produced. The resulting dispersion is then cooled to below the softening temperature of the resin and the powder recovered. A continuous dispersion process for the preparation of finely divided polymer particles is disclosed in U.S. Pat. No. 3,432,483. The process comprises the sequential steps of feeding to the polymer, water and a water-soluble block copolymer of ethylene oxide and propylene oxide surfactant into a dispersion zone; vigorously agitating the mixture under elevated temperature and pressure to form a dispersion of the molten polymer; withdrawing a portion of the dispersion and cooling to a temperature below the melting point of said polymer to form solid, finely divided polymer particles in the dispersion; reducing the pressure of said cooled dispersion to atmospheric pressure; separating the solid polymer particles from the surfactant solution phase and washing; drying the washed polymer particles; and recovering dry, finely divided powder.

While microfine powders of propylene polymers can be produced using the above-described dispersion processes, the powders obtained typically have a large number of particles which are 10 microns or less in size. The presence of these fines not only limits the utility of the product but also presents recovery problems. It would be highly desirable if microfine powders of crystalline propylene polymers could be produced wherein the amount of fines is significantly reduced. These and other advantages are realized by the present invention which is described in more detail to follow.

SUMMARY OF THE INVENTION

It has now quite unexpectedly been discovered that improved powders of propylene polymers are produced when the polymer is visbroken before it is subjected to the powder-forming dispersion operation. By using a visbroken propylene polymer, it is possible to significantly alter the particle size distribution of the resulting powder and, most advantageously, markedly reduce the amount of fines in the powder. The powder particles produced by the process are spherical or substantially spherical. While visbreaking propylene polymers to increase melt flow rate and facilitate processability is known, the ability to modify the characteristics of powders produced therefrom is totally unexpected. When powders are produced using dispersion procedures from visbroken and non-visbroken propylene polymers having identical melt flow rates, the powder obtained from the visbroken product has significantly reduced fines.

The process of the invention, to produce improved microfine propylene polymer powders having reduced fines and improved particle size distribution, comprises dispersing a visbroken propylene polymer and a nonionic surfactant which is a block copolymer of ethylene oxide and propylene oxide in a polar liquid medium which is not a solvent for the propylene polymer, said nonionic surfactant present in an amount from 4 to 50 percent, based on the weight of the propylene polymer, and the weight ratio of said polar liquid medium to propylene polymer ranging from 0.5:1 to 10:1, at a temperature above the melting point of the propylene polymer to produce droplets of the desired size and then cooling the dispersion to below the melting point of the propylene polymer and recovering the propylene polymer powder. Propylene polymers which are visbroken and utilized in accordance with the invention to produce the improved microfine powders are homopolymers of propylene or copolymers of propylene with up to 25 weight percent ethylene. Typically, the propylene polymers have crystallinity contents of 40 to 75 percent. Propylene homopolymer and random copolymers of propylene with 1 to 10 weight percent ethylene are particularly advantageous.

In one embodiment of the invention, the propylene polymer is visbroken at an elevated temperature in the presence of an organic peroxide. As a result of the visbreaking operation, the melt flow rate of the propylene polymer is increased by one unit or more. The visbroken propylene polymers generally have a melt flow rates greater than 1 and less than 1000. Melt flow rates after visbreaking are more preferably in the range of 2 to 100 and, even more preferably, 2 to 80. The resulting microfine powders are comprised of particles which are spherical or substantially spherical in shape and which have a number average particle size from about 25 to 60 microns. The powders contain less than about 10 percent fines, i.e., particles under 10 microns in size.

DETAILED DESCRIPTION OF THE INVENTION

Figure 1:
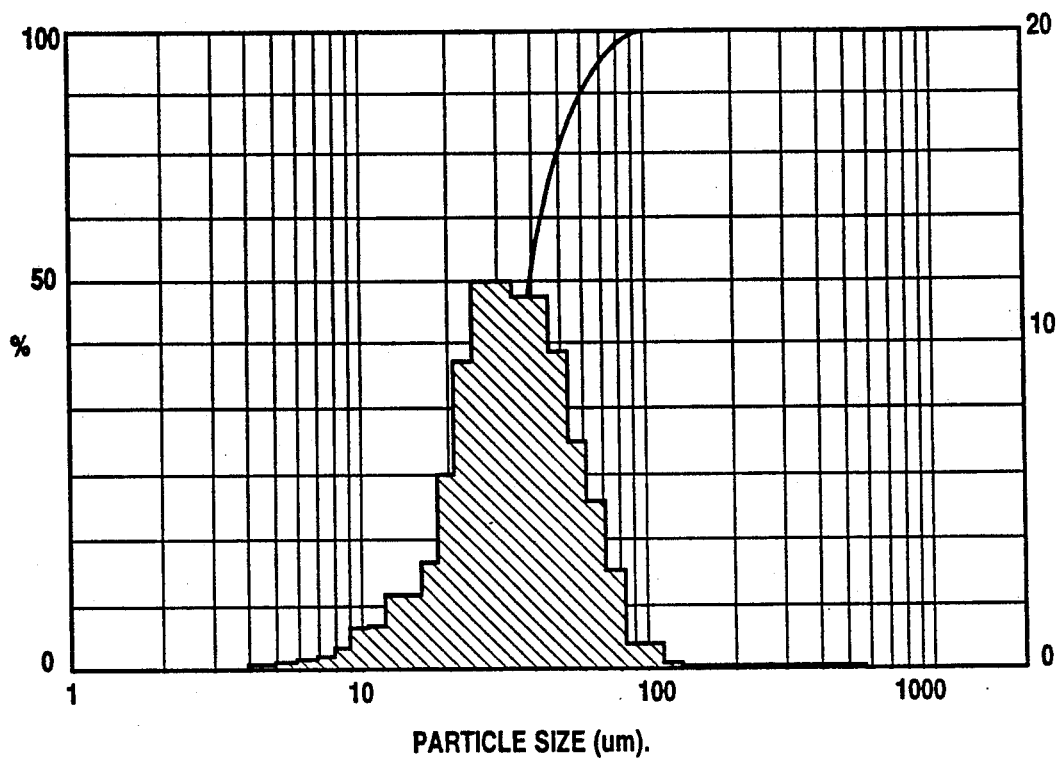
FIG. 1 is a plot (% vs. particle size) obtained from the Malvern Particle Size Analyzer illustrating the particle size distribution of powder produced in accordance with the invention from a 20 MFR polypropylene homopolymer obtained by visbreaking a 5 MFR reactor produced homopolymer to 20 MFR prior to the powder forming operation.

To produce the improved powders of the present invention propylene polymers having crystallinity contents as determined by x-ray diffraction from about 40 percent up to about 75 percent are employed. Useful propylene polymers can include homopolymers of propylene and copolymers of propylene with up to about 25 weight percent ethylene.

Crystalline, isotactic propylene homopolymers are known and commercially available. All of these polypropylene resins, which can vary in melt flow rates and physical properties, are capable of being visbroken and can be converted to microfine powders in accordance with the invention. Crystallinity contents of the propylene homopolymers usually range from about 50 percent up to about 70 percent and, more typically, from 55 percent to 65 percent.

Copolymers of propylene with ethylene, random and block, are also known and can be used to produce useful powders in accordance with this invention. Numerous polymerization procedures are described in the prior art for their preparation of these random and block copolymers. Block copolymers, for example, can be made in accordance with the processes of U.S. Pat. Nos. 3,970,719 or 4,039,632.

The random copolymers will generally contain from 1 to 10 weight percent ethylene and, more preferably, from 1 to 5 weight percent ethylene. The block copolymers will generally contain from 5 to 25 weight percent ethylene and, more preferably, from 5 to 20 weight percent ethylene. The random and block propylene copolymers generally have crystallinity contents of from 45 percent to 65 percent and, more typically, from 50 to 65 percent. Small amounts of other polymerizable monomers may be included with the propylene and ethylene if desired.

Propylene homopolymers and copolymers of the above types are generally discussed in Volume 16 of Kirk-Othmer's *Encyclopedia of Chemical Technology*, 3rd Edition, pp. 453-467 and in Volume 13 of *Encyclopedia of Polymer Science and Engineering*, 1988, pp. 464-530, the contents of which are incorporated herein by reference.

To achieve the improved microfine powders of the invention, it is necessary to employ a propylene polymer of one of the foregoing types which has been visbroken. Visbreaking propylene polymers to increase their melt flow rate and improve processability is known and numerous procedures are described in the art, such as in U.S. Pat. Nos. 3,144,436, 3,940,739 and 4,061,694. It is not known, however, that visbreaking is capable of influencing the characteristics of propylene polymer powders produced using dispersion procedures.

Visbreaking is the controlled degradation of propylene polymers and two methods, thermal and chemical, are most commonly employed to effect this modification. Both methods involve working the polymer at an elevated temperature using a suitable mixer. Mixers which impart shear during the mixing are preferentially used. Such mixers include single or twin-screw extruders, Banbury mixers or the like. These operations are typically carried out until the desired modification is achieved. In batch operations, for example, the operation will be carried out for a period of time sufficient to effect the desired melt flow rate change. In continuous operations, such as where extruders are used to bring about the visbreaking, residence time can be varied or multiple passes can be made to increase melt flow rate change.

Thermal visbreaking or degradation of propylene polymers is generally carried out at temperatures in excess of about 550° F. and in the absence of free radical initiators. For chemical visbreaking about 50 up to about 2000 ppm free radical initiator, such as a peroxide, hydroperoxide, azo or diazo compound is included with the polymer. Chemical visbreaking is carried out at a temperature which is above the melting point of the polymer and above the decomposition temperature of the initiator, typically from about 350° F. to 550° F.

The visbroken propylene polymers from which the improved powders are produced necessarily have melt flow rates, determined in accordance with ASTM D1238, Condition L, greater than 1. Acceptable dispersions, i.e., dispersions having droplets of the requisite size to form fine powders, cannot be produced with polymers having melt flow rates less than 1. It is even more advantageous when producing powders using the dispersion process that the visbroken propylene polymers have melt flow rates greater than about 2. Aside from the foregoing limitation, melt flow rates of the visbroken propylene polymers are governed by the particular application for which the powder is intended. While melt flow rates of visbroken propylene polymers may go as high as 1000 or above, equipment and process limitations generally dictate that melt flow rates not exceed about 100. Accordingly, for most applications, the melt flow rate of the visbroken propylene polymer, and the resulting powder formed therefrom, ranges from 2 to 100 and, more preferably, from 2 to 80. In a highly useful embodiment of the invention the melt flow rate of the visbroken propylene polymer is from 2 to about 40. In an even more advantageous embodiment, the melt flow rate of the visbroken propylene homopolymer or copolymer used to produce the powder is in the range 5 to 35.

The extent to which the original propylene polymer is visbroken is not critical and primarily depends on the melt flow rate of the original material, i.e., the propylene polymer as obtained from the polymerization reactor, and the desired powder melt flow rate. All that is necessary for the process of the invention to produce the improved powders is that the melt flow rate of the visbroken propylene polymer be at least one unit greater than the melt flow rate of the original reactor-produced propylene polymer. In the usual practice of the invention, however, the increase in melt flow rate will be greater than one unit.

While the various factors which contribute to the improvement in the powders of the invention are not understood, it is known that the ability to improve particle size distribution and significantly reduce the amount of particles 10 microns or less in size is not solely a function of the final melt flow rate of the propylene polymer. This is apparent from the data showing that when visbroken and non-visbroken propylene polymers having the same melt flow rates are dispersed, the powders produced have significantly different powder characteristics. While both visbroken and non-visbroken propylene polymers having melt flow rates above about 2 are readily dispersible and form powders in the dispersion process, only powders of visbroken polypropylene polymers have reduced fines and the desired particle size distribution.

The microfine propylene polymer powders prepared in accordance with the invention are comprised of particles which are spherical or substantially spherical in shape and which have a number average particle size from about 25 microns to about 60 microns and, more preferably, from about 30 microns to 50 microns. Particles under 10 microns in size will not exceed 10 percent. Powders having fines, i.e., particles under 10 microns, contents of 5 or below are particularly useful. Melt flow rates of the resulting improved microfine powders will not be significantly different than that of the starting visbroken propylene polymer. Accordingly, powder melt flow rates will generally not exceed 100 and more usually will range from 2 to 80. The visbroken propylene polymer powders of the invention having reduced fines are highly useful as electrostatic powder coatings.

The visbroken polypropylene polymer is converted to a microfine powder using known dispersion procedures such as those of U.S. Pat. Nos. 3,422,049, 3,432,483 and 3,746,681, details of which are incorporated herein by reference. For the powder-forming operation, the visbroken propylene polymer is charged to the reactor with a polar liquid medium and a nonionic surfactant and a dispersion is formed in accordance with conventional dispersing procedures described in the art. The dispersing apparatus may be any device capable of delivering sufficient shearing action to the mixture at elevated temperature and pressure. Conventional propeller stirrers designed to impart high shear which are commercially available can be used for this purpose. The reactor may also be equipped with baffles to assist in dispersion. Particle size and particle size distribution will vary depending on the shearing action which, in turn, is related to the stirrer design and rate of stirring. Agitation rates can vary over wide limits but the speed of the stirrer will usually be controlled so that the tip speed is between about 500 and 3500 ft/min and, more commonly, 750 and 3000 ft/min. A higher tip speed is generally required for batch operation, usually 2500–3000 ft/min. Tip speeds for continuous procedures most generally range between 750 and 2500 ft/min.

The dispersion process is typically conducted in an autoclave since this permits the process to be conducted at elevated temperature and pressure. In the usual batch conduct of the process, all of the ingredients are charged to the autoclave and the mixture is heated to a temperature above the melting point of the propylene polymer. While the temperature will vary depending on the specific polymer being used, it will typically range from about 90° C. to 250° C. Since the fluidity of polymers is temperature related, it may be desirable to carry out the process at temperatures substantially above the melting point of the olefin copolymer to facilitate dispersion formation. The temperature, however, should not exceed the thermal degradation temperature of the polymer.

Stirring is commenced after the desired temperature is reached and continued until a dispersion of the desired droplet size is produced. This will vary depending on the particular propylene polymer being used, the temperature, the amount and type of surfactant, and other process variables but generally will range from about 5 minutes to about 2 hours. Most generally, stirring is maintained for a period from 10 to 30 minutes.

A polar liquid medium which is not a solvent for the propylene polymer is employed to form the dispersions. These polar mediums are hydroxylic compounds and can include water, alcohols, polyols and mixtures thereof. The weight ratio of the polar liquid medium to polymer ranges from about 0.8:1 to about 9:1 and, more preferably, from 1:1 to 5:1. It is particularly advantageous to use water as the dispersing medium or to use a liquid medium where water is the major component.

The pressure of the process is not critical so long as a liquid phase is maintained and can range from about 1 up to about 217 atmospheres. The process can be conducted at autogenous pressure or the pressure can be adjusted to exceed the vapor pressure of the liquid medium at the operating temperature. Most generally, with aqueous dispersions the pressure will range from about 5 to 120 atmospheres.

In order to obtain suitable dispersions, one or more dispersing agents are necessarily employed. Useful dispersing agents are nonionic surfactants which are block copolymers of ethylene oxide and propylene oxide. Preferably, these nonionic surfactants are water- soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to 50 percent, based on the weight of the propylene polymer. Most preferably, the nonionic surfactant is present from about 7 to 45 percent, based on the weight of the polymer.

Useful nonionic surface active agents of the above type are manufactured and sold by BASF Corporation, Chemicals Division under the trademark Pluronic. These products are obtained by polymerizing ethylene oxide on the ends of a preformed polymeric base of polyoxypropylene. Both the molecular weight of the polyoxypropylene base and the polyoxyethylene segments can be varied to yield a wide variety of products. One such compound found to be suitable for the practice of the process of this invention is the product designated as F-98 wherein a polyoxypropylene of average molecular weight of 2,700 is polymerized with ethylene oxide to give a product of molecular weight averaging about 13,500. This product contains 20 weight percent propylene oxide and 80 weight percent ethylene oxide. Other effective Pluronic® surfactants include F-88 (M.W. 11,250, 20% propylene oxide, 80% ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least 4,500, are highly effective as dispersing agents for the aforementioned propylene polymers.

It is also possible to employ products sold under the trademark Tetronic which are prepared by building propylene oxide block copolymer chains onto an ethylenediamine nucleus and then polymerizing with ethylene oxide. Tetronic ® 707 and Tetronic ® 908 are most effective for the present purposes. Tetronic ® 707 has a 30 weight percent polyoxypropylene portion of 2,700 molecular weight polymerized with a 70 weight percent oxyethylene portion to give an overall molecular weight of 12,000. Tetronic ® 908, on the other hand, has a 20 weight percent polyoxypropylene portion of 2,900 molecular weight polymerized with an 80 weight percent oxyethylene portion to give an overall molecular weight of 27,000. In general, useful Tetronic ® surfactants have molecular weights above 10,000 and contain a major portion by weight of ethylene oxide.

The powder-forming process may also be conducted in a continuous manner. If continuous operation is desired, the ingredients are continuously introduced to the system while removing the dispersion from another part of the system. The ingredients may be separately charged or may be combined for introduction to the autoclave.

The following examples illustrate the process of the invention and the improved powders obtained therefrom more fully. As will be apparent to those skilled in the art, numerous variations are possible and are within the scope of the invention.

Melt flow rates referred to in the examples were measured in accordance with ASTM D1238-89 at 190° C. at 230° C. with a Tinius Olsen Extrusion Plastometer. The melt flow rate (MFR) is expressed in grams per 10 minutes.

An electrically heated two-liter Paar pressure autoclave equipped with thermowell and thermocouple connected to a digital display was used to prepare the dispersions. The autoclave was equipped with an agitator and a Strahman valve to permit rapid discharge of the hot dispersion. The agitator had three, six-bladed, impellers and was driven by a 2 HP DC variable speed motor. A 5 gallon stainless steel discharge tank was connected to the reactor via a 1" diameter stainless steel line. The hot dispersion was rapidly discharged into this tank containing approximately 6.5 liters 20°-23° C. water at the completion of each run. The hot dispersion was introduced below the surface of the water in the discharge tank.

Powders produced in the examples were analyzed using laser light scattering to measure the size distribution by volume. This technique uses the principle of diffraction from the particles as the measurement means. A Model 2600C Malvern Particle Size Analyzer with the proper lens configuration for the expected particle size interfaced to a computer which reads the diffraction pattern and performs the necessary integrations digitally was used. For the analysis, water is charged to the water bath and circulated through the sample measuring chamber. After obtaining the baseline measurement, the agitator and sonic vibrator are turned on and powder is added to the water bath until the obscuration reading is 0.3. Mixing and circulation are controlled to obtain acceptable dispersion without excessive foaming. A drop of liquid detergent is added to facilitate dispersion. After eight minutes agitation, measurements are commenced and the size distribution data are automatically tabulated. The cumulative volume undersize and volume frequency are tabulated for 32 size classes together with useful derived parameters. A logarithmic plot is also produced. Duplicate runs are made for each powder sample. The particle size reported in the examples is the number average particle size D(v, 0.5). The range reported for particle size distributions in the examples is for 80 percent of the volume distribution curve, i.e., from D(v, 0.1) to D(v, 0.9). In other words, ten percent of the powder particles are sized below the recited lower limit and 10 percent of the powder particles are larger than the upper recited particle size limit. This range provides a convenient means of comparing powders.

EXAMPLE I

To demonstrate the ability to produce improved polypropylene powders having reduced fines the following example is provided.

(a) Visbreaking—A commercially available general purpose propylene homopolymer suitable for the production of containers and housewares (MFR 5; tensile strength 4900 psi; flexural modulus 210,000 psi) was visbroken by mixing with 3500 ppm di-(2-t-butylperoxyisopropyl)benzene. A Killion Laboratory Extruder equipped with four heating zones ($T_1$ 350° F.; $T_2$ 375° F.; $T_3$ 400° F.; $T_4$ 425° F.) was employed for the visbreaking. The polypropylene contained 1500 ppm conventional stabilizers. In a single pass through the extruder, the MFR of the propylene homopolymer was increased from 5 to 20.

(b) Powder Formation—450 Grams of the above-prepared visbroken polymer was charged to an autoclave with 180 grams nonionic surfactant (Pluronic ® F-98 —a block copolymer of ethylene oxide and propylene oxide of molecular weight 13500 and containing 20% propylene oxide). Water (810 grams) was then added and the reactor was sealed and heated. When the temperature reached 210° C., agitation (3500 rpm) was commenced and maintained for 15 minutes. The temperature ranged from 216° C. to 232° C. during the agitation period and a maximum pressure of 480 psi was developed in the reactor. At the completion of the stirring interval, the dispersion was rapidly discharged into the discharge tank. The resulting powder was recovered by vacuum filtering the slurry through the filter cloth (96×74 threads; 5 harness sateen weave; standard flow rate 15-24 cfm). The product retained on the filter was redispersed in 2 liters water and refiltered. The wet material was air-dried to obtain a free-flowing powder which was analyzed using the Malvern Particle Size Analyzer. Powder characteristics are reported in Table I and FIG. 1 is the particle size distribution plot generated for the powder showing the percentage of particles over the entire particle size range. Microscopic examination of the powder showed the particles to be spherically shaped.

COMPARISON A

Figure 2:
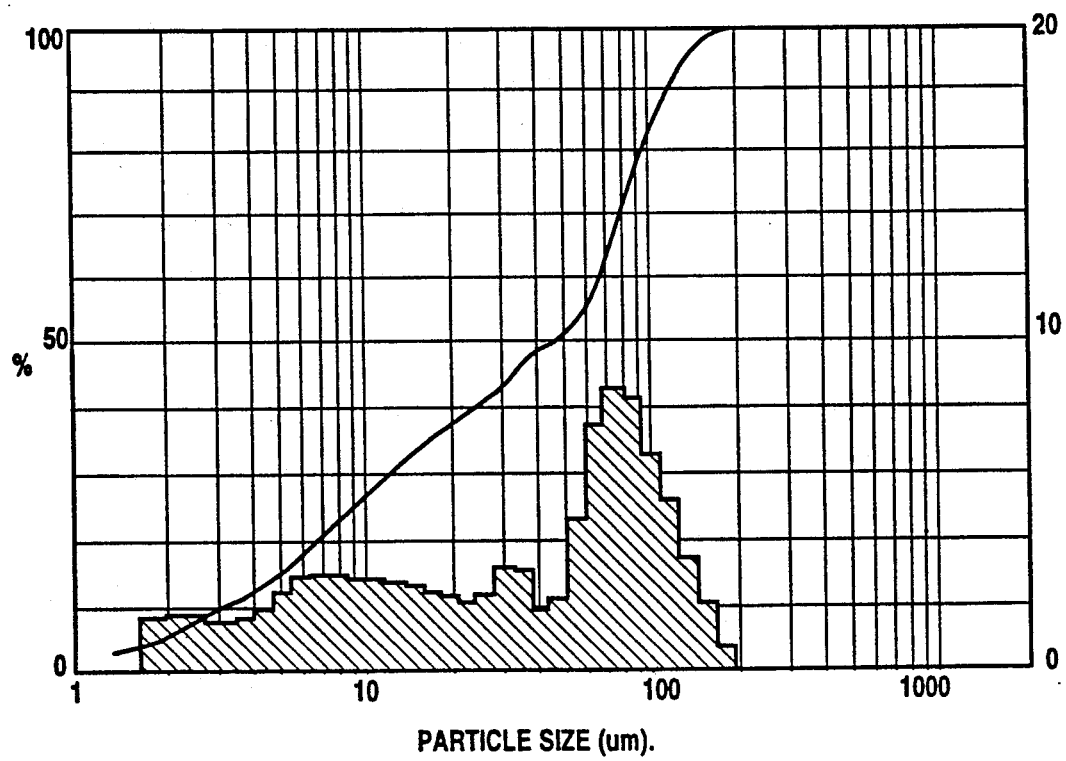
FIG. 2 is a plot (% vs. particle size) obtained from the Malvern Particle Size Analyzer illustrating the particle size distribution of a comparative powder produced from a 20 MFR polypropylene homopolymer. The homopolymer used for this comparison was not visbroken but rather reactor synthesized to 20 MFR and the powder directly prepared therefrom.

To illustrate the improved results obtained with the process of the invention wherein a visbroken propylene polymer is used to prepare the powder, the following comparative experiment was carried out. For this example a commercially available general purpose propylene homopolymer directly synthesized to a melt flow rate of 20 and having a tensile strength 5200 psi and flexural modulus 240,000 psi was utilized. The general procedure described in Example I to produce the powders was employed. The amount of polypropylene, nonionic surfactant and water were the same as used in Example I. Agitation was maintained at 2500 rpm for 30 minutes while the temperature was maintained in the range 218° C. to 225° C. The resulting powder was characterized and results are reported in Table 1. FIG. 2 is the particle size distribution curve generated for the powder using the Malvern Particle Size Analyzer.

COMPARISON B

To further illustrate the improvements obtained with the invention, another comparative powder was produced utilizing the directly synthesized propylene homopolymer used for Comparison A having a MFR of 20. For this experiment, however, the amount of nonionic surfactant used was reduced to 135 grams. The amount of polymer and water used were the same. Agitation time was 30 minutes at 2500 rpm and the temperature during the agitation period ranged from 218° C. to 223° C. The resulting powder was analyzed to determine average particle size and particle size distribution. Results are provided in Table I.

EXAMPLE II

To further illustrate the invention, improved powders were produced using a random copolymer of propylene and ethylene.

(a) Visbreaking—A commercially available general purpose propylene copolymer resin suitable for blow molding and sheet extrusion was employed. The polymer was a random copolymer of propylene with about 3 weight percent ethylene and had a MFR of 2, tensile strength of 4200 psi and flexural modulus of 135,000 psi. The copolymer was visbroken by extruding with 3500 ppm organic peroxide in a Killion extruder. The procedure and conditions employed were the same as described in Example I. The MFR of the visbroken material obtained after one pass through the extruder was increased from 2 to 11.6.

Figure 3:
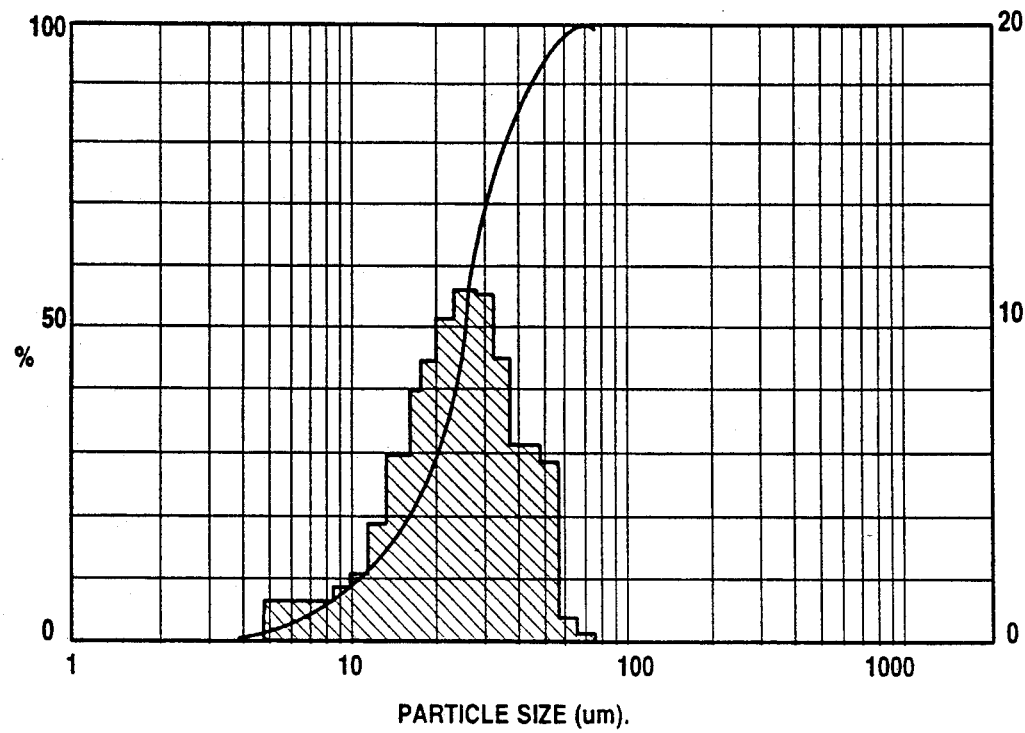
FIG. 3 is a plot (% vs. particle size) obtained from the Malvern Particle Size Analyzer which shows the particle size distribution of a powder produced in accordance with the invention from a 9 MFR random propylene-ethylene copolymer. A reactor-produced 2 MFR random copolymer was visbroken to MFR 9 before forming the powder.

(b) Powder formation—The above-prepared visbroken random copolymer (450 grams) was charged to the autoclave with 180 grams nonionic surfactant and 810 grams water and dispersed as described in Example I. To achieve dispersion, the mixture was heated to 210° C. and agitated for 15 minutes at 3500 rpm. The temperature was maintained at 215° C. to 227° C. over this period and the maximum pressure developed was 410 psi. The powder (melt flow rate 12-13) was recovered in the usual manner and analyzed. Powder characteristics are reported in Table 1. FIG. 3 is the particle size distribution plot generated for the powder using the Malvern Particle Size Analyzer.

COMPARISON C

Figure 4:
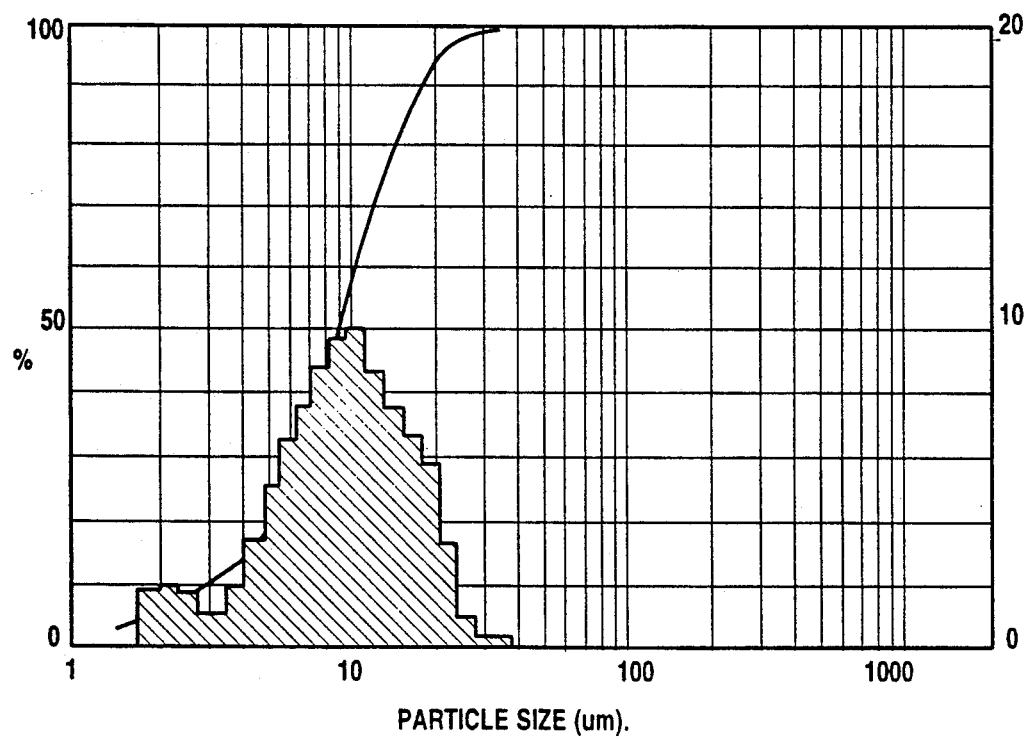
FIG. 4 is a plot (% vs. particle size) obtained from the Malvern Particle Size Analyzer showing the particle size distribution of a comparative powder produced from a reactor synthesized 10 MFR random copolymer of propylene and ethylene which was not visbroken.

A directly synthesized random copolymer having a melt flow rate of 10 and ethylene content of 3% (tensile strength 3700 psi; flexural modulus 130,000 psi) was dispersed following the general procedure of Example II. After heating the mixture to 210° C. the dispersion was agitated for 15 minutes at 3500 rpm. The temperature was maintained at 215° C. to 228° C. during the agitation and the maximum pressure was 420 psi. The comparative powder was analyzed to characterize the powder in the usual manner and results are reported in Table 1. FIG. 4 is the plot generated for the comparative powder showing the percentage of particles over the entire particle size distribution range.

EXAMPLE III

To demonstrate the ability to vary the conditions in the powder forming operation, the following experiment was conducted using the visbroken random copolymer (MFR 11.6) produced in Example II. For this reaction, the visbroken copolymer (450 grams) and surfactant (180 grams) were simultaneously charged to the reactor. The water (810 grams) was then added and the reactor was sealed. Dispersion was achieved by heating to 210° C. and agitating for approximately 2 minutes at 4900-4950 rpm. The temperature ranged from 216° C. to 223° C. during the agitation period. Stirring was discontinued and the dispersion was discharged after about 1-2 minutes. The recovered copolymer powder was analyzed and results are reported in Table I.

TABLE 1

| PRODUCT | I | COMP. A | COMP. B | II | COMP. C | III |
|---|---|---|---|---|---|---|
| Average Particle | 33.8 | 41.0 | 13.6 | 26.1 | 8.9 | 29.7 |

TABLE 1-continued

| PRODUCT | I | COMP. A | COMP. B | II | COMP. C | III |
|---|---|---|---|---|---|---|
| Size (microns) | | | | | | |
| Particles Under 10 Microns in Size (%) | <2.2 | >26.2 | >40.6 | <8.0 | >56.6 | <4.6 |
| Particle Size Distribution (microns) | 18.1–60.9 | 3.5–108.0 | 2.4–56.9 | 11.9–49.8 | 2.7–17.8 | 15.1–51.7 |

We claim:

1. In a process for producing propylene polymer powders comprising the steps of:
   (1) heating a propylene polymer to above the melt point of the polymer with a nonionic surfactant which is a block copolymer of ethylene oxide and propylene oxide and a polar liquid medium which is not a solvent for the propylene polymer; said nonionic surfactant present in an amount from 4 to 50 percent, based on the weight of the propylene polymer, and the weight ratio of said polar liquid medium to propylene polymer ranging from 0.5:1 to 10:1;
   (2) dispersing the mixture to produce droplets of the desired size;
   (3) cooling the dispersion to below the melt point of the propylene polymer; and
   (4) recovering the propylene polymer powder; to obtain powders having reduced fines and improved particle size distribution; the improvement wherein the propylene polymer is a visbroken propylene polymer having a melt flow rate greater than 1.

2. The process of claim 1 wherein the propylene polymer is a homopolymer of propylene or a copolymer of propylene with up to 25 weight percent ethylene.

3. The process of claim 2 wherein the propylene polymer has a crystallinity content from 40 to 75 percent.

4. The process of claim 2 wherein the melt flow rate of the visbroken propylene polymer is from 2 up to about 100.

5. The process of claim 4 wherein the propylene polymer is visbroken by contacting with an organic peroxide at an elevated temperature.

6. The process of claim 4 wherein the visbroken propylene polymer is polypropylene having a melt flow rate from 2 to 40.

7. The process of claim 6 wherein the melt flow rate is 5 to 35.

8. The process of claim 4 wherein the visbroken propylene polymer is a random copolymer of propylene and 1 to 10 weight percent ethylene having a melt flow rate from 2 to 40.

9. The process of claim 8 wherein the melt flow rate is 5 to 35.

10. The process of claim 9 wherein the random copolymer contains 1 to 5 weight percent ethylene.

11. A visbroken propylene polymer microfine powder comprised of particles which are spherical or substantially spherical in shape and having a number average particle size from 25 to 60 microns and wherein particles under 10 microns in size do not exceed 10 percent.

12. The microfine powder of claim 11 wherein the propylene polymer is a homopolymer of polypropylene or a copolymer of polypropylene with up to 25 weight percent ethylene visbroken to a melt flow rate of 2 to 100.

13. The microfine powder of claim 12 wherein the propylene polymer has a crystallinity content from 40 to 75 percent.

14. The microfine powder of claim 12 wherein the propylene polymer is polypropylene having a melt flow rate from 2 to 40.

15. The microfine powder of claim 12 wherein the propylene polymer is a random copolymer of propylene and 1 to 10 weight percent ethylene having a melt flow rate from 2 to 40.

16. The microfine powder of claim 12 having a number average particle size from 30 to 50 microns.

17. The microfine powder of claim 16 wherein particles under 10 microns in size do not exceed 5 percent.

* * * * *